United States Patent [19]

Kampfenkel et al.

[11] 4,207,751
[45] Jun. 17, 1980

[54] SORPTION HEAT PUMP

[75] Inventors: Ottomar Kampfenkel, Hückeswagen; Antun Gelesic, Neuss, both of Fed. Rep. of Germany

[73] Assignee: Joh. Vaillant GmbH u. Co., Remscheid, Fed. Rep. of Germany

[21] Appl. No.: 932,322

[22] Filed: Aug. 9, 1978

[30] Foreign Application Priority Data

| Aug. 10, 1977 | [DE] | Fed. Rep. of Germany ... 7725127[U] |
| Aug. 10, 1977 | [DE] | Fed. Rep. of Germany ... 7725128[U] |
| Aug. 10, 1977 | [DE] | Fed. Rep. of Germany ... 7725129[U] |
| Dec. 17, 1977 | [DE] | Fed. Rep. of Germany ... 7738864[U] |

[51] Int. Cl.² .............. F25B 15/00; F25B 27/02; F25B 13/00; F25B 41/04
[52] U.S. Cl. ............................ 62/141; 62/238; 62/324; 62/222; 62/476
[58] Field of Search ............ 62/141, 238 B, 324 B, 62/495, 476, 183, 222

[56] References Cited

U.S. PATENT DOCUMENTS

| 2,027,610 | 1/1936 | Nesselman et al. ............... 62/238 |
| 3,440,832 | 4/1969 | Aronson .......................... 62/476 X |
| 3,527,060 | 9/1970 | Kruggel ........................... 62/476 X |
| 3,605,432 | 9/1971 | Wada ............................... 62/324 B |
| 3,638,452 | 2/1972 | Kruggel ........................... 62/495 X |
| 3,641,784 | 2/1972 | Schlichtig ....................... 62/495 X |
| 4,070,870 | 1/1978 | Bahel et al. .................... 62/324 B |
| 4,127,010 | 11/1978 | Phillips .......................... 62/495 X |
| 4,134,273 | 1/1979 | Brautigam ....................... 62/141 |

Primary Examiner—Lloyd L. King
Attorney, Agent, or Firm—Toren, McGeady and Stanger

[57] ABSTRACT

A sorption heat pump including a fuel energized discharge unit from which heated fluid media for the heat pump is provided and a circuit having the fluid media circulated therethrough and arranged to include a heat exchanger, an absorber, pump devices, a temperature level changer and an energy consumption circuit. The discharge unit operates to emit the fluid media into the circuit as a heated weak solution and to receive the fluid media returned from the circuit as a rich solution. The discharge unit also produces an overheated vapor. The temperature level changer comprises a first and a second heat exchange unit, with the first unit being directly connected to the discharge unit to receive the weak solution therefrom, with the first unit also being connected to form part of a supply line for the energy consumption circuit. The second heat exchange unit of the temperature level changer is connected to return rich solution to the discharge unit and it is also connected to receive the overheated vapor from the discharge unit.

22 Claims, 3 Drawing Figures

SORPTION HEAT PUMP

BACKGROUND OF THE INVENTION

This invention relates to a sorption heat pump comprising a fuel-heated discharge unit to which is connected a circuit through which flows a high-heated weak solution supplied from the discharge unit, which is returned to the discharge unit via a heat exchanger, an absorber, and a pump as well as a temperature exchanger, the domestic circuit being provided with a series connection of heat exchangers.

A heat pump of the type indicated is disclosed in prior art such as German DT OS No. 2,402,777. From the discharge unit of such a heat pump the high-heated weak solution reaches a fuel heat exchanger, thereafter passes into the absorber, is drawn off from the same by a pump and is fed to the condenser via the temperature exchanger, from where it is fed to the discharge unit.

This prior art arrangement suffers from the disadvantage that the maximum temperature of the weak solution leaving the discharge unit cannot be utilized for obtaining the highest possible supply temperature to a heating system and/or a domestic water heater operating as part of the system. In the prior art the maximum temperature level is reduced in order to preheat the cold rich solution prior to its entrance into the condenser.

It is an object of this invention to provide a sorption heat pump by which a heating system including radiators and/or domestic water heaters connected thereto can be supplied with a supply temperature which is as high as possible.

SUMMARY OF THE INVENTION

In a sorption heat pump of the type indicated hereinbefore there is provided a system which comprises a temperature exchanger which has two heat exchangers, one of which is directly connected to the connection of the discharge unit for the weak solution as well as to the domestic supply, while the other is connected directly to the connection line for the return of the rich solution to the discharge unit, and to the connection for overheated steam from the discharge unit.

The technical advance of the invention resides in the fact that although domestic water of sufficiently high temperature is attainable without after-heating aggregate, nonetheless, the plant has an excellent efficiency. The temperature exchanger prevents temperature from falling below a point of condensation in the fuel gas stack.

In a sorption pump comprising a discharge unit, an absorber and a condenser as well as an evaporator with a pre-connected expansion valve, the condenser together with the absorber being designed as a heat exchanger for heating a domestic fluid, it is advantageous to provide that the expansion valve is bridged by a by-pass valve and that the condenser-heat exchanger can be separated from the user element by a valve adapted to be actuated by a transmitter together with the by-pass valve.

Finally, it is expedient in a sorption heat pump comprising a discharge unit, an absorber, a condenser as well as an expansion valve and an evaporator as well as a domestic circuit connected via a heat exchanger of the absorber and/or the condenser to provide that in case heat is not utilized by the domestic circuit the latter is connected to a cooling unit via a change-over valve and that the evaporator is designed as a space air cooler.

It is particularly advantageous in a sorption heat pump comprising a fuel-heated discharge unit to which there is connected a circuit for a high-heated weak solution, which is supplied by and returned to the discharge unit via a heat exchanger, an absorber and a pump as well as a temperature exchanger, the domestic circuit being guided via a series connection of heat exchangers, to provide that temperature sensors are arranged in the passage of the coolant line of an evaporator as well as in the area of a heat source feeding the evaporator according to whose actual values valves are actuated in the coolant supply line to the evaporator and in the coolant supply line directly between condenser and absorber via a control element so that when a coolant temperature falls below a value adjustable at a setpoint value transmitter the evaporator can be removed from the heat pump circuit.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
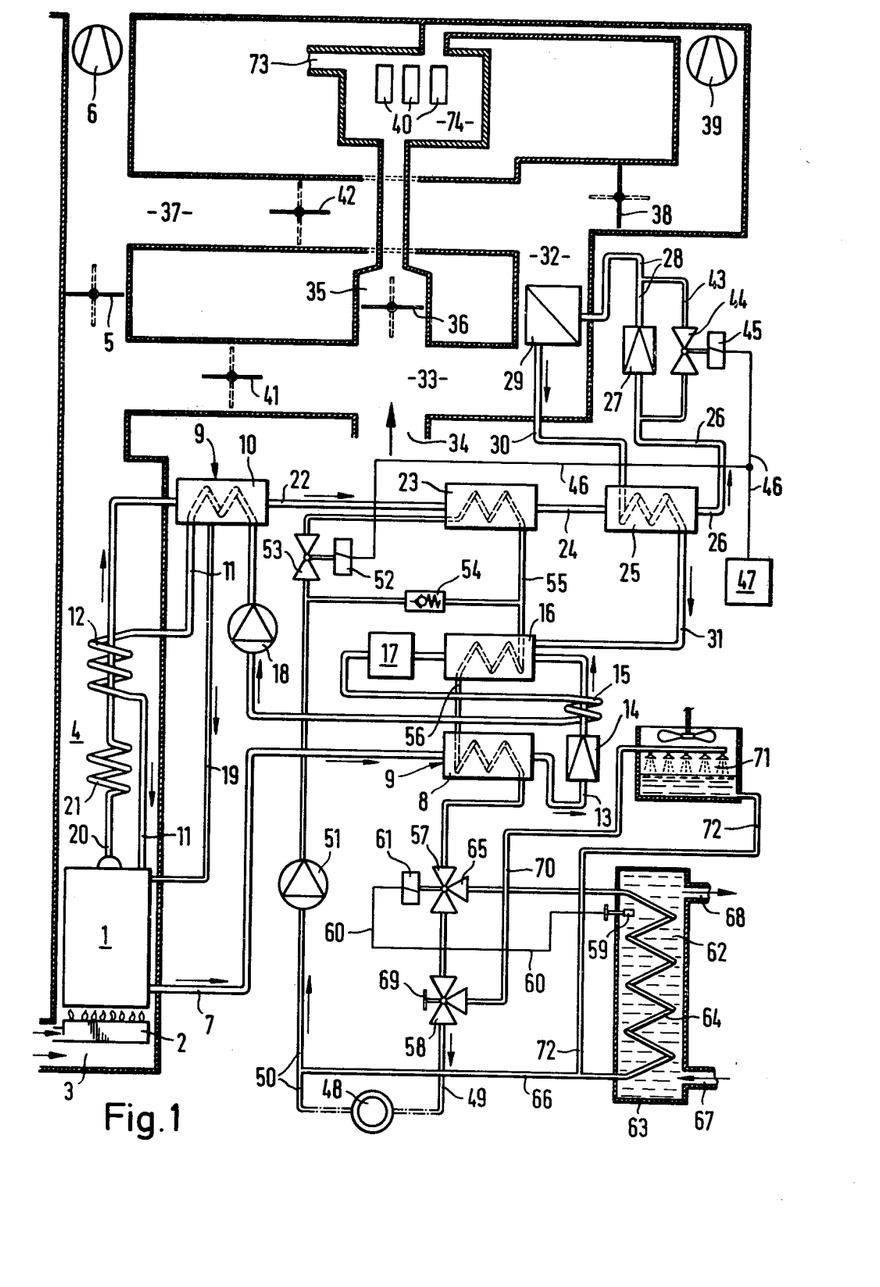
FIG. 1 is a schematic illustration of an absorption heat pump in accordance with the invention.

The sorption heat pump shown in FIG. 1 comprises a discharge unit 1 heated by a gas burner 2 to which air of combustion is supplied via a supply air line 3 and to which there is connected a waste gas stack 4 provided with a waste gas flap 5 as well as a waste gas blower 6.

In the discharge unit 1 a mixture of water and ammonia is heated, which leaves the discharge unit via the connection 7 as weak heat solution. -The weak heat solution is passed to a heat exchanger 8 forming one part of a temperature exchanger 9 whose second part includes a heat exchanger 10. The connection 7 of the discharge unit is directly connected to the heat exchanger 8. Also the heat exchanger 10 is connected to the discharge unit 1 only by the interposition of a waste gas heat exchanger 12 via a connection line 11. In the first heat exchanger 8 of the temperature exchanger 9 the weak solution which is at its highest temperature here is cooled down and is passed to an expansion valve 14 via a line 13, and from there via an intermediate heat exchanger 15 to an absorber 16. The absorber is followed by a collector 17 from where the rich cool solution is now passed to a pump 18 via the already mentioned intermediate heat exchanger 15. The pump 18 feeds the already preheated rich solution into the second heat exchanger 10 of the temperature exchanger 9 from where it is supplied again to the discharge unit 1 via the waste gas heat exchanger 12 as heated rich solution. Condensate which may possibly occur in the second heat exchanger 10 of the temperature exchanger 9 is directly supplied to the discharge unit 1 via a line 19 by-passing the waste gas heat exchanger 12.

The coolant vapor produced in the discharge unit is emitted via a connection 20 in the passage of which is connected a waste gas overheated heat exchanger 21. The high-heated vapor is supplied to the heat exchanger 10 of the temperature exchanger 9 which it leaves in a direction towards a condenser 23 via a line 22. From the condenser 23 a line 24 leads to an aftercooler 25 from where the condensate is passed to a further expansion valve 27 via a line 26. The expansion valve 27 is followed by an evaporator 29 via a line 28. From the evaporator 29 a line 30 leads back to the aftercooler 25 which is connected with the absorber 16 via a line 31.

The evaporator 29 is connected in the passage of an air line 32 connected to an air line 33. The air line 33 can be supplied with fresh air in the direction of the arrow via an inlet 34. The air line 33 has an exit opening 35 for drawing off air from a space 74 to be cooled, which can be closed by a shutoff valve 36. The space can be supplied with fresh air via inlet openings 40. The air line 33 may be placed in flow communication with the waste gas stack 4 via a further shutoff valve 41. From the waste gas stack 4 an air line 37 leads to the air line 32 between the waste gas blower 6 and the waste gas flap 5. Both extend into the space 74 to be ventilated via a further reversing valve 38 followed by a blower 39 and via a discharge opening 73 into the atmosphere. In the air line 37 a further change-over flap 42 is provided.

The waste gas flap 5 as well as the cutoff, respectively change-over flaps 36, 38, 41 and 42 are connected such that they can only assume their end positions.

In a specific case (heating) the flaps are arranged such as is indicated by their solid line positions, and in another case (cooling) they all assume the dotted line position.

The expansion valve 27 is bridged by a by-pass line 43 in the passage of which is arranged a by-pass valve 44 which is driven by a solenoid 45. The solenoid 45 is actuated by a transmitter via an electric line 46.

Both the absorber 16 and the condenser 23 are designed as heat exchangers. A domestic circuit has a plurality of radiators 48 which connect to a supply line 49 and a return flow line 50. Via a circulating pump 51 the return flow line 50 leads to a shutoff valve 53 actuated by a solenoid 52, which is followed by the heat exchanger of the condenser 23. The shutoff valve 53 and the condenser 23 are bridged via a by-pass line having a relief valve 54. The condenser 23 has its heating section connected to the heating section of the heat exchanger of the absorber 16 via a line 55, while the heat exchanger of the absorber 16 is connected with the heat exchanger 8 of the temperature exchanger 9 via a line 56. The heating section of the heat exchanger 8 of the temperature exchanger 9 has connected there to the heating supply line 49 in the passage of which there are located two reversing valves 57 and 58. The reversing valve 57 is designed as priority change-over valve and is controlled by a temperature sensor 59 via an electric line 60 and an adjusting drive unit 61. The temperature sensor 59 senses the interior 62 of a domestic water heater 63 through which is extended a coiled pipe 64 which is fed by an outlet 65 of the change-over valve and is connected with the return flow line 50 via a domestic water return flow line 66. The interior 62 of the domestic water heater 63 is supplied with cold fresh water from a connection line 67 connected to a water network; the water can be supplied to a user as heated domestic water via a tap line 68.

The second switched valve 58 can be changed over to summer or winter operation by means of a handle 69. During winter operation it connects the radiators 48 to the heat exchanger 8 of the temperature exchanger 9. During summer operation, however, the supply line 49 is connected to a by-pass line 70 leading to a cooling tower 71. From the cooling tower a line leads to the domestic water heater return flow line 66.

The elements of the sorption heat pump as hereinbefore described function as follows:

In the discharge unit 1 the rich solution is heated and the ammonia is driven out as vapor from the solution. The high-heated weak solution leaves the discharge unit 1 via the connection 7 and is led to the heat exchanger 8 of the temperature exchanger 9 via the same. In this heat exchanger the solution possesses its maximum temperature level. It is cooled off in this heat exchanger by giving off the heat of the highest temperature level to the domestic circuit i.e. to the medium positioned in the supply line 49. The solution leaves the heat exchanger 8 of the temperature exchanger in a cooled condition and is supplied to the expansion valve 14 via the line 13 to be relieved there. After passage through the intermediate heat exchanger 15 the weak solution is supplied to the absorber 16 and has a temperature level which is adapted for optimum acceptance of the coolant vapor supplied to the absorber. The heat produced during absorption in the absorber is also supplied to the heating circuit since the absorber represents the second step in the heating of the heating water. The cool rich solution leaving the absorber is supplied to the intermediate heat exchanger 15 via the collector 17 and there assumes the heat withdrawn from the weak solution prior toreaching the absorber. From the intermediate heat exchanger the rich solution raised in temperature level is now removed from the pump 18 and supplied to the second heat exchanger 10 of the temperature exchanger. Here, the rich solution reaches a further increased temperature level, since the heat exchanger 10 of the temperature exchanger 9 is supplied on its other side by the heated vapor from the discharge unit 1 via its connection 20. The vapor has previously been overheated via a waste gas overheated heat exchanger 21. In order to fully utilize the waste heat in the waste gas, the rich solution after leaving the heat exchanger 10 is also passed via a waste gas heat exchanger 12, before reaching the discharge unit again as rich solution of possibly high temperature level, in order to be heated anew.

The vapor of the coolant slightly cooled in the heat exchanger 10 of the temperature exchanger 9 condenses in the condenser 23 to which it is supplied via the line 22. The condensate is supplied to the aftercooler 25 via the line 24 so that its temperature level is further reduced. By the expansion valve 27 which is supplied with the aftercooled condensate via the line 26 the coolant evaporates in the evaporator 29 from which it is supplied via the line 30 via the aftercooler 25 to the absorber 16. The heat which was withdrawn in the aftercooler 25 from the coolant prior to passing the expansion valve 27, is supplied again to the same in a vaporous condition in order to obtain an optimum temperature level for the absorption in the absorber 16.

Thus, the water of the heating system is heated in three steps by the return flow line 50. A first temperature rise takes place in the heat exchanger of the condenser, a second in the heat exchanger of the absorber 16 and finally a third one in the heat exchanger 8 of the temperature exchanger 9. By this series connection of three heat exchangers for stepwise heating of the medium in the heating circuit high supply temperatures can be obtained in thesupply flow line 49. By means of the fluid supply system and depending on the position of the change-over valve 57, either the domestic water heater 63 is supplied in response to its temperature sensor 59 or the heating system comprised of the radiators 48 is supplied. In case during summer operation the radiators 48 cannot take any heat from the sorption heat pump, the heat is either connected to the domestic water heater 63 or to the cooling tower 71 to be discharged to ambient air depending on the position of the change-over valve 57.

During heating operation the waste gas leaving the discharge unit 1 after utilization by the waste gas heat exchanger 12, 21 and with the position of all air flaps according to the solid line position, is supplied together with fresh air via the air line 33 to the evaporator 29 and is cooled off. Subsequently, the waste gas air mixture after passing through the reversing flap 42 as the reversing flap 38 is closed, is sucked into the open air by the waste gas blower 6.

In case during summar operation a cooling of the space 74 is intended, the flaps assume the dotted line position. The waste gas of the discharge unit 1 is therefore directly sucked into the open air by the waste gas blower 6. Air is taken from the space 74 to be cooled via the exit openings 35 when the shutoff flap 36 is open. Due to the closed shutoff flap 41 waste gas cannot be sucked in. The recirculated air is supplied to the evaporator 29, if required together with fresh air via the inlet 34 where it gives off its heat. The cooled air leaving the evaporator is supplied to the space 74 to be cooled through its inlet openings 40 via the open reversing flap 38 through the blower 39; the excess air proportion is discharged into the atmosphere via the discharge openings 73. It is also possible to operate the ventilation system by recycling when the inlet 34 is closed. It is, however, also possible to exclusively supply fresh air to the space.

It is furthermore possible, when the heat pump is shut off and when the blower 39 is allowed to run, to exhaust air from the space 74 via the inlet 34 and the exit opening 35, respectively to ventilate the same via the inlet openings 40.

If the freezing in the evaporator 29 exceeds a certain threshhold, which can be detected from the viewpoint of pressure, temperature or time, the transmitter 47 will be actuated via a corresponding measuring element. The transmitter 47 causes the by-pass valve 44 to open and the shutoff valve 53 to close. While the degree of opening of the by-pass valve 44 is adjustable continuously, the shutoff valve 53 only possesses the capability of being open and closed. By shutting off the shutoff valve 53 the condenser 23 is connected to be inoperative. A heating of the consuming devices 48, 63 is only possible in two steps via the absorber 16 and via the heat exchanger 8 of the temperature exchanger 9 since when the shutoff valve 53 which is in series connection with the condenser 23 is shut off, the condenser is separated from the consuming device. The circulation of the domestic fluid however is maintained via the relief valve 54 parallel to the condenser heat exchanger. The working vapor is not deposited in the condenser 23, it is only reduced to a lower temperature level in the aftercooler 25. The working medium flows through the line 26 partly in a liquid state and partly in a vapor state. Since the expansion valve 27 alone is not able to pass a sufficient volume of vapor per unit of time, the more or less opened by-pass valve 44 guarantees that enough working medium in the liquid or vaporous state is passed to the evaporator 29. The heat still present in the working medium is sufficient to deice the heat exchanger surfaces of the evaporator 29. Subsequently, the working medium has its temperature level increased in the aftercooler and is thereafter supplied to the absorber 16 via the line 31.

Since a specific freezing rate occurs at a specific temperature level of the ambient air which is supplied to the evaporator 29 via the inlet 34 and the air line 33, and at a specific capacity of the sorption heat pump, changing over of the valves 44, 53 can be accomplished via a timer, the function of the heat pump, with or without condenser adjustment by the timer, being controlled by the ambient temperature and/or the humidity of the incoming air. It is, however, also possible to control the duration of the interval of switching off of the condenser via the shutoff valve 53, and thus the deicing interval on the evaporator, in dependence on time in that either the evaporator temperature or the pressure in the evaporator is detected and supplied to the transmitter 47 as a measuring signal.

It is possible, during winter operation to supply to the space 74 preheated fresh air or fresh/recirculated air by switching the heat pump for this period to evaporator deicing operation and switching off the blower 39.

During summer operation the change-over valve 58 is switched by the handle 69 such that the radiators 48 are excluded from the circuit. As long as the domestic water heater 63 requires heat, the change-over valve 57 is in a position in which the heating circuit fluid flows from the supply line 49 through the domestic water heater. If, however, the domestic water heater when exceeding a temperature limit adjustable at the temperature sensor 59 cannot withdraw any heat from the sorption heat pump, the priority valve is switched back. Since the sorption heat pump remains in operation for cooling of the setup space by the evaporator 29, the unwanted heat occurring now in the area of the heating circuit is supplied to the cooling tower 71 via the by-pass line 70. The fluid is cooled via the line 72 and fed to the return flow line 50 of the heating system. In the cooling tower 71 the excess heat is supplied to the ambient air. At that moment where the temperature level in the interior 62 of the domestic water heater 63 passes below the lower threshold adjusted at the temperature sensor 59, the change-over valve 57 again switches to priority, and the sorption heat pump again supplies the domestic water heater 63 by maintaining the cooling of the ambient air through the evaporator 29.

The above described embodiment substantially deals with the problem to so design a sorption heat pump that the user is supplied with supply water of a possibly high temperature. This is substantially achieved in that the domestic water is heated in at least two heat exchangers to an optimum level, the last heat exchanger in the passage of the domestic line being a temperature exchanger which, in turn, is connected directly behind the discharge unit.

In a heat pump of the type indicated it may happen that, for instance, due to repair work in the area of the expansion valve or of the evaporator or at too low temperature of the energy source feeding the evaporator, heat pump operation becomes impossible or uneconomical, while, however, heat supply to the user must be maintained and no other heat source than the one aggregate used for the heat pump is available.

The solution of this problem resides in the fact that there are provided in the passage of the coolant line for an evaporator, as well as in the area of a heat source feeding the evaporator, temperature sensors according to whose actual values valves in the coolant supply line to the evaporator and in the coolant supply line immediately between condenser and absorber are actuated via an adjusting element so that when a coolant temperature adjustable at a setpoint value transmitter falls below the set value the evaporator is withdrawn from the heat pump circulation.

The advance in the technical art attainable thereby substantially resides in the fact that in dependence on variables in the passage of the heat source it is determined whether a heat pump operation or a furnace operation of the discharge unit is more economical, and whether the user, due to failure or repair work on the evaporator, can be supplied with heat via furnace operation only.

Figure 2:
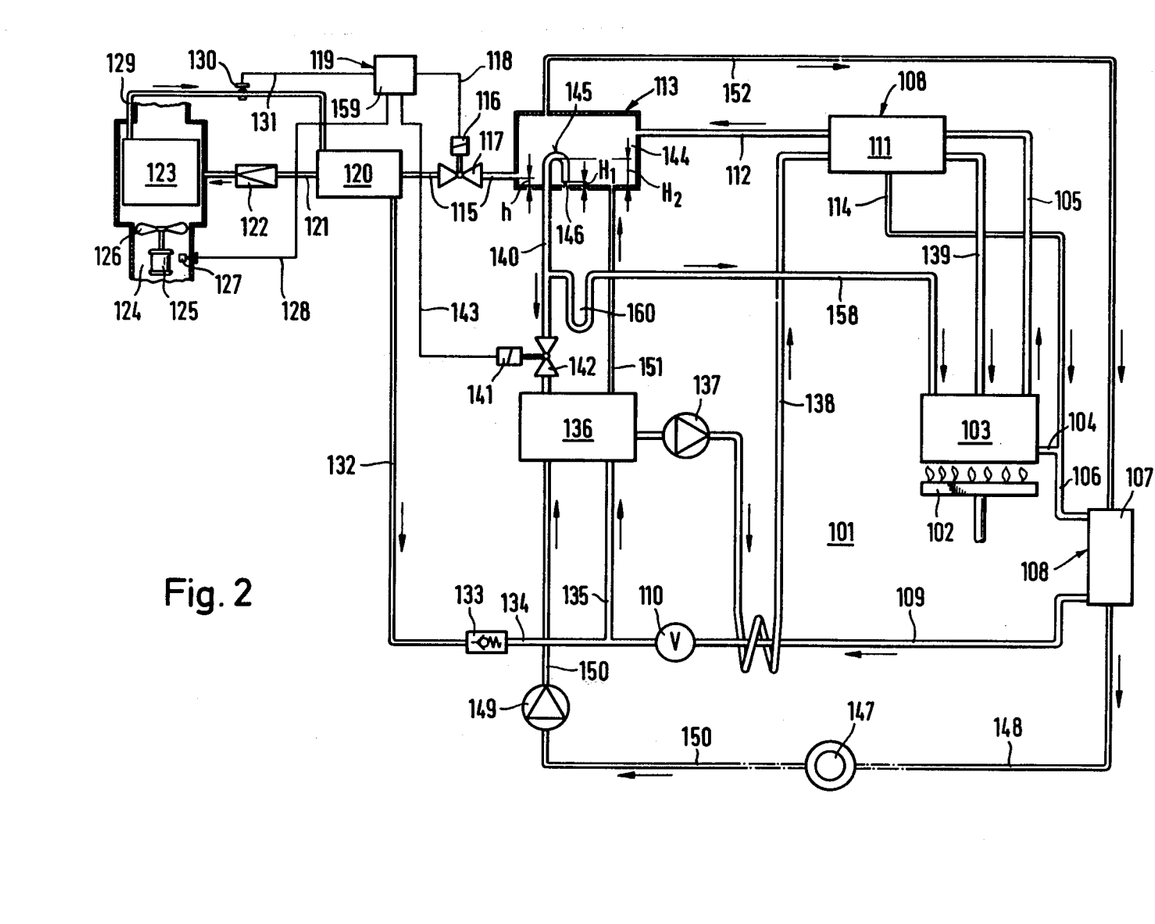
FIG. 2 is a schematic illustration showing the circuitry of another absorption heat pump.
Figure 3:
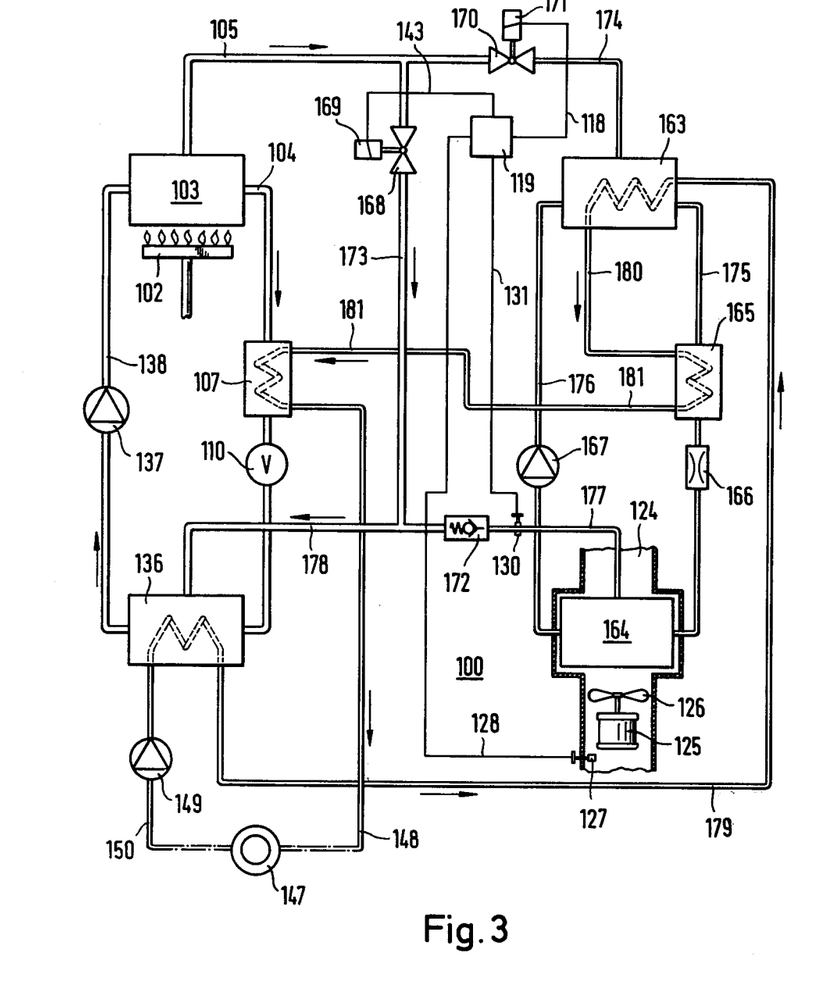
FIG. 3 is a schematic illustration showing the circuits of a resorption heat pump.

FIG. 2 is a principal illustration of the circuits of an absorption heat pump and FIG. 3 a principal illustration of the circuits of a resorption heat pump.

An absorption heat pump 101 according to FIG. 2 has a discharge unit 103 supplied with heat from a burner 102, with a line 104 for high-heated weak solution and a line 105 for high-heated coolant vapor extending therefrom. In the embodiment, the solvent used is water, and ammonia is used as coolant. The line 104 leads via a line 106 to a first heat exchanger 107 of a temperature exchanger 108 from which the weak solution at a lower temperature is emitted in the passage of a line 109 in which is provided a control valve 110.

The line 105 is connected with a second heat exchanger 111 of the temperature exchanger 108 from which the coolant vapor at a lower temperature level is passed to a condenser 113 via a line 112. Water condensed from the high-heated coolant vapor in the area of the heat exchanger 111 of the temperature exchanger 108 is discharged via a discharge line 114 which is in connection with the lines 104 and 106 and passes water of very low concentration as coolant.

From the condenser 113 the coolant in liquid form is withdrawn via a line 115 whose connection is provided in the interior of the condenser at a specific level h. In the passage of the line 115 there is provided a solenoid valve 117 which can be actuated by a magnetic coil 116 and which can be controlled by an adjusting element 119 via an adjusting line 118. Behind the solenoid valve 117 the line 115 leads to a heat exchanger 120 from which the coolant leaves via a line 121 in which an expansion valve 122 is provided. The line 121 connects to an evaporator 123 through which an air channel 124 extends in which there are provided a blower 126 driven by a motor 125 as well as a temperature sensor 127, which is connected via a measuring line 128 with the adjusting element 119.

If necessary, waste gas instead of air can be supplied through the air channel 124, for instance by an internal combustion engine or by another heat source.

Coolant vapor leaves the evaporator 123 via a line 129 in which there is arranged a temperature sensor 130 which is in connection with the adjusting element 119 via a measuring line 131. The line 129 leads back to the heat exchanger 120 from where the coolant vapor is supplied to a relief valve 133 via a line 132 now at a higher temperature level corresponding approximately to the temperature level in the condenser 113. The control valve 110 as well as the relief valve 133 are connected with each other via a line 134 from which there extends a line 135 for flow of the mixture of weak solution and coolant vapor to an absorber 136. The now rich solution is returned to the heat exchanger 111 of the temperature changer 108 via a line 138 provided with a pump 137 and from there at a high temperature level to the discharge unit 103 via a line 139.

Condenser 113 and absorber 136 are directly connected with each other via a line 140 of relatively large cross-section for passage of liquid coolant with the interposition of a solenoid valve 142 provided with a magnetic coil 141, the coil 141 being energized by the adjusting element 119 via an adjusting line 143.

The line 140 starts in the interior 144 of the condenser 113 in the form of a bend 145. The port 146 of the bend 145 facing downwardly is at a level $H_1$ which is smaller than the level h of the connection of the line 115. The point of bending of the line 140, however, is at a level $H_2$ which is higher than the level h of the connection of the line 115.

A consuming device 147 is connected to the absorption heat pump 101 via a domestic supply line 148 and a domestic return flow line 150 via a circulating pump 149. The domestic return flow line 150 extends through the absorber 136, passes to the condenser 113 via an intermediate line 151 and from there it leads to the heat exchanger 107 of the temperature exchanger 108 via a further intermediate line 152, from which the heated-up medium is supplied to the domestic supply line 148.

It is self-explanatory that the consuming device need not necessarily be supplied in a circuit; it is rather also possible to connect the domestic return flow line 150 to a cold water system and to supply the water after having passed the consuming device, to the waste water.

The absorption heat pump just described has the following function:

Heat pump operation

By the heat energy supplied to the discharge unit 103 by the gas or oil burner 102 the rich solution present there is heated and decomposed into its components. The high-heated coolant vapor leaves the discharge unit 103 via the line 105 and is caused to assume a lower temperature level in the heat exchanger 111 of the temperature exchanger 108. The heat transmitted by the coolant vapor serves on the one hand to preheat the rich solution coming from the absorber 136 in the passage of the line 138 prior to its entrance into the discharge unit 103. Water condensing during reduction of the temperature level of the coolant vapor, which still includes slight traces of the coolant, is supplied via the discharge line 114 to the line 106 to which is also supplied via the line 104 high-heated weak solution originating from the discharge unit. The mixed solution produced by the combination of the two solutions is supplied to the heat exchanger 107 of the temperature exchanger 108 and transmits its heat to the domestic supply line 148. The strongly cooled weak solution leaves the heat exchanger 107 via the line 109 and is supplied to the absorber 136 via the line 135 in accordance with the degree of opening of the control valve 110. Heat of solution is set free in the heat exchanger 107 of the temperature exchanger 108, since the weak solution directly originating from the discharge unit, has a different rate of concentration than the solution which originates as condensation product from the heat exchanger 111 of the temperature exchanger 108.

In the area of the absorber 136 liquid coolant of a relatively high concentration of ammonia in water meets with a weak solution from the heat exchanger 107 of the temperature exchanger 108 in the passage of the lines 109 and 135 so that here too a medium concentration of a rich solution will be had leading to the transmission of heat of solution in the absorber. While the heat of solution set free in the temperature exchanger 108 is directly supplied to the consuming device, the heat of solution set free in the absorber is used on the one hand to preheat the rich solution to be supplied to the absorber and, on the other hand to preheat the return medium of the consuming device 147 in the area of a first stage of heating.

The coolant vapor supplied to the condenser 113 via the line 112 condenses there and has its temperature level reduced as condensate via the line 115 after overcoming the level h via the heat exchanger 120 and is supplied to the expansion valve 122 via the line 121 where it starts to evaporate after passing the expansion valve. The evaporation in the area of the evaporator 123 is effected among others in response to the heat energy supplied via the air channel 124 which is sensed by the temperature sensor 127.

Coolant vapor is returned to the heat exchanger 120 via the line 129 and is re-heated there. The temperature of the line 129 is sensed by the temperature sensor 130. The coolant vapor is supplied to the absorber 136 via the line 132 and combined with the weak solution from the line 109. The now rich coolant solution is pumped off by the pump 137 from the absorber and caused to assume a higher temperature level via the heat exchanger 111 of the temperature exchanger 108 prior to returning to the discharge unit via the line 139. During operation of the heat pump the solenoid valve 117 is open and the solenoid valve 142 is closed. Liquid coolant is supplied from the condenser first to the evaporator 123 only when the level h has been overcome, i.e. a specific quantity of condensed coolant is present in the condenser. If the quantity of coolant present in the condenser 113 increases, it will be directly supplied to the discharge unit 103 after exceeding the level $H_2$ via the line 140—the solenoid valve 142 still being closed—via a line 158. The safety line is provided to insure that the discharge unit always has available coolant in sufficient quantity. Due to the different levels h and $H_1$ it is ensured that the port 146 of the line 140 in the condenser 113 is always closed by liquid coolant.

If the temperature of the coolant vapor in the line 129 falls below a limit value adjustable at a setpoint value transmitter 159, the adjusting element 119 switches over. As a result, by operation of elements not illustrated the motor 125 of the blower 126 is disconnected and a reversal of the positions of the solenoid valves 117 and 142 is obtained.

While the solenoid valve 117 is now closed, the solenoid valve 142 opens. This means that the level of the coolant in the condenser 113 increases, until the level $H_2$ is obtained. Subsequently the liquid coolant flows into the absorber 136 via the line 140, expansion valve 122 and evaporator 123 being removed from the circuit. The relief valve 133 prevents a return flow to there two parts.

Furnace operation

After the change-over of the two solenoid valves 117 and 142 just described the rich solution in the discharge unit 103 is decomposed by energy supply from the burner 102 into coolant vapor and weak solution. These two heat carrying media supply their heat, via the heat exchanger 107 of the temperature exchanger 108 as a last heating stage, to the domestic supply line 148 for the consuming device 147 and in the heat exchanger 111 of the temperature exchanger 108 for preheating the rich solution supplied to the discharge unit. From the heat exchanger 111 of the temperature exchanger 108 the coolant is supplied to the condenser from where it passes into the absorber 136 via the line 140 by maintaining a level corresponding to the level $H_2$. Herein the coolant combines with the weak solution, and both are returned to the discharge unit 103 via the line 139 after temperature increase in the heat exchanger 111 of the temperature exchanger 108.

Thus a three-stage heating takes place for the consuming device 147 during furnace operation similarly to heat pump operation. The return flow water is first preheated in the area of the absorber 136, it is subsequently further heated in the condenser and it is finally heated in the area of the heat exchanger 107 of the temperature exchanger 108.

If the temperature of the heat medium in the passage of the air channel 124 reaches a limit value set at the setpoint value transmitter 159, this will lead to a changeover of the adjusting element 119 in response to this value measured by the temperature sensor 127, so that the switching states of the solenoid valves 117 and 142 are changed.

Now, the solenoid valve 142 closes while the solenoid valve 117 re-opens and the system re-assumes heat pump operation Liquid coolant present in the passage of the line 140 is still supplied to the discharge unit 103 via the safety line 158, but coolant remains in the area of a siphon 160 before the solenoid valve 142. This means that in case of a defective pump 137 or defective solenoid valve 142 a drying out of the discharge unit is prevented. The syphon 160 prevents the short-circuit for coolant vapor between discharge unit 103 and absorber 136.

It is also expedient in the case of partial condensation of the coolant vapor in the condenser 113 to so control the control valve 110 that increasing coolant vapor proportions in the line 140 have associated therewith increased throughput cross sections of the control valve 110 and vice versa, in order to optimize the absorber pressure.

It is also possible to design the absorption heat pump 101 just described as a resorption heat pump 100 in accordance with FIG. 3. To this end a resorber 163 and an exhauster 164 are provided which are interconnected via a temperature exchanger/heat exchanger 165 and a throttle valve 166 on the one side, and by a solution pump 167 on the other side, to form one circuit. Temperature exchanger heat exchanger 165 and throttle valve 66 are connected in the passage of a line 175 in series, and the solution pump 167 is arranged in a line 176. The resorber 163 is connected with a line 105 via a line 174, in which there is provided a solenoid valve 170 actuated by a magnetic coil 171, and with the exhauster 164 which can be compared in its function to the evaporator 123. The exhauster 164 is connected to a line 178, corresponding to the line 135, via a line 177, in which there is arranged the temperature sensor 130, and via a relief valve 172.

The lines 105 and 178 are interconnected via a bypass line 173 in which there is provided a solenoid valve 168 actuated by a magnetic coil 169.

The consuming device 147 is arranged such that its domestic return flow line 150 is first passed to the absorber 136 via the circulating pump 149, and then via a line 179 to the resorber 163. From there a line 180 extends to the temperature exchanger/heat exchanger 165, and then via a line 181 to the actual heat exchanger 107 of the temperature exchanger 108 from which the domestic supply line 148 is supplied.

In the passage of the exhauster 164 there is provided the air channel 124 including the temperature sensor 127. The temperature sensor 127 controls the adjusting element 119 which energizes the solenoid valves 168 and 170.

During resorption operation both the discharge unit 103 and also the absorber 136 as well as the resorber 163 and the exhauster 164 are in operation. Since the by-pass line 173 is made inoperative by closing the solenoid valve 168, during furnace operation this solenoid valve is opened by the temperature sensor 127 if the solenoid valve 170 is closed when a specific temperature level is not reached. During furnace operation the coolant vapor in the line 105 is immediately supplied to the absorber by circuiting the resorber/exhauster of the line 178.

While specific embodiments of the invention have been shown and described in detail to illustrate the application of the inventive principles, it will be understood that the invention may be embodied otherwise without departing from such principles.

What we claim is

1. A sorption heat pump comprising a discharge unit, an absorber, a condenser, an evaporator with a preconnected expansion valve, said condenser and said absorber being designed as a heat exchanger for heating a fluid utilized as an energy consumption fluid in an energy consumption device, said expansion valve being bridged by a bypass valve, with said condenser heat exchanger being separated from said energy consumption device by a valve capable of being actuated by a transmitter together with said bypass valve.

2. A heat pump according to claim 1 wherein said transmitter is controlled by a time element for bridging said expansion valve and for switching to an off condition said condenser heat exchanger.

3. A heat pump according to claim 2 wherein the time for switching to an off condition said condenser heat exchanger and for bridging said expansion valve is controlled in response to one of the temperature and the humidity of supply air in an air channel to said evaporator.

4. A heat pump according to claim 1 wherein said transmitter is directly controlled by a temperature sensor arranged at the output of said evaporator.

5. A heat pump according to claim 1 wherein said transmitter is directly controlled by a pressure sensor arranged at the output of said evaporator.

6. In a sorption heat pump including a fuel energized discharge unit for supplying fluid media for said heat pump and circuit means having said fluid media circulated therethrough and including heat exchanger means, absorber means, pump means, temperature level change means and energy consumption circuit means, said discharge unit operating to emit said fluid media into said circuit means as heated weak solution and to receive said fluid media returned from said circuit means as rich solution, and to also produce overheated vapor, the improvement wherein said temperature level change means comprise: a first and a second heat exchange unit, said first heat exchange unit being directly connected to said discharge unit to receive said weak solution therefrom and also being connected to form part of a supply line for said energy consumption circuit means, said second heat exchange unit being connected to return rich solution to said discharge unit and also being connected to receive said overheated vapor from said discharge unit; and preheater means located between said second heat exchange unit and said discharge unit for effecting heat transfer from said overheated vapor to said rich solution incoming from said second heat exchange unit to said discharge unit in order thereby to preheat said incoming rich solutions.

7. A heat pump according to claim 6 further comprising condensor means in said circuit means, means defining a coolant supply line, an evaporator provided in the passage of said coolant supply line, valve means in said coolant supply line and valve means between said condenser means and said absorber means, temperature sensor means and setpoint value transmitter means, said valve means being actuated in accordance with said temperature sensor means and said setpoint value transmitter means such that when coolant temperature of said evaporator drops below a set value adjustable at said setpoint value transmitter means, said evaporator is withdrawn from said circuit means.

8. A heat pump according to claim 7 further comprising a separating unit for solvent in said second heat exchanger unit of said temperature level change means, and a discharge line connecting said separating unit with said discharge unit.

9. A heat pump according to claim 7 wherein a liquid coolant coming from said condenser as well as weak solution coming from said first heat exchange unit of said temperature level change means are combined in said absorber means, said absorber means being connected to said energy consumption circuit in a return flow line thereof as a heat exchanger.

10. A heat pump according to claim 9 further including a coolant line extending from said condenser means to said absorber means and a coolant line extending from said condenser means to said evaporator, both said coolant lines originating from said condenser means and being provided with valves located at different levels originating in said condenser means, said line leading to said absorber means originating at a lower level than said line leading to said evaporator, but being extended to a higher level by means of a bend formed therein before reaching said absorber means.

11. A heat pump according to claim 10 further including a valve located between said condenser means and said absorber means, and a safety line extending from between said condenser means and said valve communicating with said discharge unit and being connected at said point between said condenser means and said valve by a syphon.

12. A heat pump according to claim 6 wherein said circuit means further include condenser means, a line connecting in flow communication said condenser means with said absorber means, and control valve means located within said connecting line, said control valve means operating in case of partial condensation of coolant vapor in said condenser means such that increasing coolant vapor proportions will have associated therewith greater cross sectional flow areas in said connecting line through said valve means.

13. A heat pump according to claim 7 operating as a resorption heat pump and including a resorber, an exhauster, an absorber and valve means located in a coolant vapor line extending between said discharge unit and said resorber, with temperature sensing means located between said exhauster and said absorber operating to control said valve means by operation of an adjusting element.

14. A heat pump according to claim 13 wherein said valve means comprise two solenoid valves and a relief valve located between said absorber and said exhauster, said valve means operating to effect short circuiting of vapor from said discharge unit to said absorber.

15. A heat pump according to claim 12 further including a control valve connected between said discharge unit and said absorber, and a heat exchanger connected between said discharge unit and said control valve which is supplied with a rich solution leaving said absorber.

16. A heat pump according to claim 6 wherein said preheater means includes a connection line having a waste gas heat exchanger formed therein connected between said second unit and said discharge unit through which said rich solution is returned to said discharge unit.

17. A heat pump according to claim 16 further including a bypass line for bypassing said waste gas heat exchanger and connecting said second unit directly to said discharge unit for delivering to said discharge unit condensate formed in said second unit.

18. A heat pump according to claim 16 wherein a waste gas overheated heat exchanger is interposed between said discharge unit and said second heat exchange unit through which said second heat exchange unit receives said overheated vapor from said discharge unit.

19. A heat pump according to claim 6 including an intermediate heat exchanger connected in said circuit means relative to said absorber means to reduce the temperature level of weak solution entering said absorber means and to increase the temperature level of rich solution leaving said absorber means.

20. A heat pump according to claim 18 wherein said waste gas overheated heat exchanger and said waste gas heat exchanger are integrated into a single heat exchange unit.

21. In a sorption heat pump including a fuel energized discharge unit for supplying fluid media for said heat pump and circuit means having said fluid media circulated therethrough and including heat exchanger means, absorber means, pump means, temperature level change means and energy consumption circuit means, said discharge unit operating to emit said fluid media into said circuit means as heated weak solution and to receive said fluid media returned from said circuit means as rich solution, and to also produce overheated vapor, the improvement wherein said temperature level change means comprise: a first and a second heat exchange unit, said first heat exchange unit being directly connected to said discharge unit to receive said weak solution therefrom and also being connected to form part of a supply line for said energy consumption circuit means, said second heat exchange unit being connected to return rich solution to said discharge unit and also being connected to receive said overheated vapor from said discharge unit; a connection line having a waste gas heat exchanger formed therein connected between said second unit and said discharge unit through which said rich solution is returned to said discharge unit; and a bypass line for bypassing said waste gas heat exchanger and connecting said second unit directly to said discharge unit for delivering to said discharge unit condensate formed in said second unit.

22. A sorption heat pump comprising a discharge unit, an absorber, a condenser, an expansion valve, an evaporator, an energy consumption circuit, a heat exchanger of said absorber and condenser connected with said energy consumption circuit, said evaporator being designed as a space cooler, said pump further including a changeover valve operating to connect said energy consumption circuit to said cooler when said energy consumption circuit is arranged not to utilize heat during its operation, and an air channel through which supply air is provided, said changeover valve operating in response to temperature of the supply air to said air channel.

* * * * *